United States Patent [19]

Barbanell

[11] Patent Number: 5,056,880
[45] Date of Patent: Oct. 15, 1991

[54] HOLOGRAPHIC WALLPAPER

[75] Inventor: Joseph Barbanell, Pleasant Hill, Calif.

[73] Assignee: DZ Company, Walnut Creek, Calif.

[21] Appl. No.: 505,428

[22] Filed: Apr. 8, 1990

[51] Int. Cl.⁵ .......................... G03H 1/16; G03H 1/30
[52] U.S. Cl. ...................................... 359/29; 264/1.3; 359/25; 359/28; 359/30
[58] Field of Search ................... 350/3.66, 3.67, 3.68, 350/3.69, 3.78, 3.84, 3.82, 3.85, 3.86, 3.6, 3.83; 264/1.3; D5/99

[56] References Cited

U.S. PATENT DOCUMENTS

| | | | |
|---|---|---|---|
| 3,560,071 | 2/1971 | Silverman et al. | 350/3.67 |
| 3,560,072 | 2/1971 | Silverman et al. | 350/3.68 |
| 3,719,409 | 3/1973 | Vincelette | 350/3.78 |
| 3,772,457 | 11/1973 | Macovski | 350/3.66 |
| 3,869,575 | 3/1975 | Spitz et al. | 350/3.78 |
| 3,936,138 | 2/1976 | Noguchi | 350/3.84 |
| 3,985,419 | 10/1976 | Matsumoto et al. | 350/3.84 |
| 3,988,572 | 10/1976 | Constant | 350/3.66 |
| 4,018,503 | 4/1977 | Silverman et al. | |
| 4,125,760 | 11/1978 | Nyfeler | 350/3.69 |
| 4,206,965 | 6/1980 | McGrew . | |
| 4,629,282 | 12/1986 | McGrew . | |
| 4,717,221 | 1/1988 | McGrew . | |
| 4,758,296 | 7/1988 | McGrew . | |
| 4,778,262 | 10/1988 | Haines | 350/3.66 |
| 4,832,424 | 5/1989 | McGrew . | |

Primary Examiner—Bruce Y. Arnold
Assistant Examiner—Martin Lerner
Attorney, Agent, or Firm—Limbach, Limbach & Sutton

[57] ABSTRACT

An inexpensive wallpaper, which may be plastic and self adhesive. Using the positive features and advantages of thin-layer holograms and other existing technology, the claimed invention produces a changing, moving or stable 3-D effect in the presence of a low-powered laser illuminating system. In usual (incoherent) light, the claimed wallpaper reflects light as does a standard wallpaper. On the claimed wallpaper, images of any kind can be additionally printed without damaging the coherent 3-D reconstruction. The claimed wallpaper produces 3-D images, whose qualities are not affected by mechanical damage of any kind, including scratching or scraping, and it can also be produced in a washable embodiment. The suggested object incorporates recognized computer techniques, by which an image of any level of complexity can be included. The wallpaper can be printed on plastic or other media by sequentially applying a pre-prepared small-area matrix. In one embodiment, the recognized embossing technique is readily applicable, and the said matrix then represents the embossing die. In the process of printing (embossing) an additional structural measure for image quality improvement can be easily introduced.

20 Claims, 3 Drawing Sheets

HOLOGRAPHIC WALLPAPER

FIELD OF THE INVENTION

The invention is a method and system for producing holographic wallpaper, and for reconstructing an image holographically recorded on the wallpaper.

SUMMARY OF THE INVENTION

The invention is an inexpensive wallpaper, which may be plastic and self-adhesive. Using the positive features and advantages of thin-layer holograms and other existing technology, the invention produces a changing, moving or stable 3-D effect when scanned by a low-powered laser illumination system. In usual (incoherent) light, the claimed wallpaper reflects light as does standard wallpaper. On the claimed wallpaper, images of any kind can be additionally printed without damaging the coherent 3-D reconstruction.

The claimed wallpaper produces 3-D images, whose qualities are not affected by mechanical damage of any kind, including scratching or scraping, and it can also be produced in a washable embodiment. The suggested object incorporates recognized computer techniques, by which an image of any level of complexity can be included. The wallpaper can be printed on plastic or other media by sequentially applying a pre-prepared small-area matrix. In one embodiment, the recognized embossing technique is readily applicable, and the said matrix then represents the embossing die.

In the process of printing (embossing), additional structural measures for image quality improvement can be easily introduced.

DETAILED DESCRIPTION OF THE PREFERRED EMBODIMENT

Figure 1:
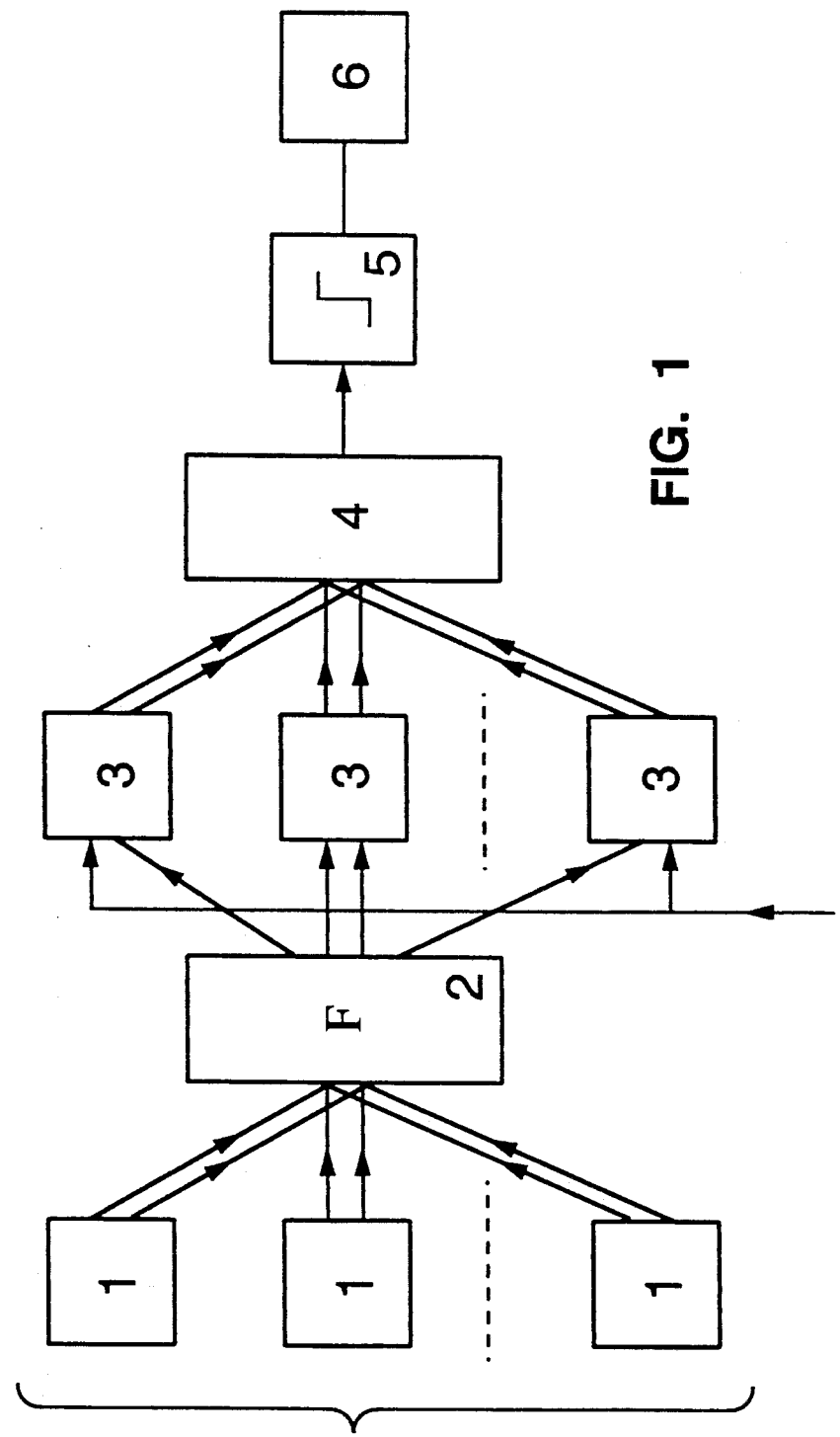
FIG. 1 is a diagram representing a method and system for producing the inventive wallpaper in which the following reference numerals represent the following elements: 1 is a set of initial 3-D images (or an image in separate stages, representing a moving image(s)); 2 is a Fourier-transformer; 3 is a set of spatial frequency submodulators with subcarriers being supplied; 4 is a combiner; 5 is an amplitude-phase binary discretizer (digitizer); and 6 is a printing matrix.

The claimed object applies the recognized procedures of hologram reconstruction in a new area of application—wallpaper. The demands of wallpaper dictate special features and corresponding elements to be incorporated, providing in due order, both the low-powered laser illumination and high-quality image reconstruction.

The structural addition of the new elements in the computerized process of printing matrix production, does not affect the complexity or the cost of the entire process.

The description given in general terms below, where corresponding operators can be realized analogously if necessary, can be implemented in an inexpensive one-time computerized procedure.

The wallpaper under claim utilizes thin-layer holograms. The principles of such holograms' recording and reconstructions should be stated briefly, with their advantages emphasized.

The physically existing object (or its 3-D image for computerized applications especially) is recorded holographically on 2-D media, using a spatial subcarrier/carriers: an angularly deflected, coherent "reference" beam.

Reconstruction is realized by scanning with a coherent (laser) beam also, resulting in reproduction of the initial 3-D picture, or the image of the object.

In addition to exploiting the simplicity of recognized methods and techniques, the invention possesses the following advantages: any part of the hologram exactly reconstructs the initial image, and the quality of reconstruction is not affected by the mechanical damage of any kind.

These recognized features are based on the fact, that in thin-layer holograms the recorded information is spread or "smeared" over the entire surface of the recording media.

The simplicity of the above description makes it possible to computerize the process of such hologram production. The feature of the exact image representation by a small part of the hologram is utilized in the object under claim.

However, for the reproduction of large images as might be needed in the wallpaper under suggestion, the method has its drawbacks, based on the required coherent illumination. To produce both good quality and sufficient brightness of the reconstructed image, relatively powerful lasers are needed.

To some extent this problem may be dealt with by using phase holograms (thin-layer holograms being recorded on the phase-relief media), the diffraction efficiency (or brightness) of which is three to four times greater. In the claimed object only such holograms are considered. Their incorporation is based not only on their greater brightness, but also on the simplicity of "printing" the claimed wallpaper.

The printing process utilizes a small area matrix, which has been precomputerized, and sequentially applied to the corresponding media.

Considering the above requirements, and respectively the low-powered and inexpensive illumination especially, some additional structural measures are incorporated. They are included both on the recording and reconstruction steps and are based on the theoretical results of the inventor.

Any degree of complexity during the computerized step of the printing matrix production will not affect the resulting costs. This is because the said small-area matrix (embossing die) is printed repeatedly on the entire wallpaper surface. Additionally, it should be realized that the incorporated pattern would be the same for wallpaper covering any area. Only the bigger area which is covered, the bigger and more impressive 3-D effect of the same stable or moving picture(s) would be.

With the incorporation of recognized algorithms, the printing pattern matrix is easily realized by computer. This with an additional encoding step is represented by FIG. 1.

All the transformations represented here in the general form, are easily performed by computer using the standard routine digital procedures by computer.

FIG. 1 represents a method for producing the wallpaper of the invention, in which initial 3-D images are supplied to Fourier-transformer 2, the output of element 2 is then supplied to spatial frequency sub-modulation means 3, the output of element 3 is then supplied to combiner 4, the output of combiner 4 is then supplied to binary digitizer 5, and the output of digitizer 5 is supplied to matrix 6.

Digitizer 5 is included based on the previous works of the inventor. All other steps, excluding the digitizing step, are recognized and easily performed either optically or by the use of computer. In optics for instance, the set of spatial sub-modulators 3 is realized easily by changing the angle of axial orientation of the coherent reference wave. Considering the above, in some cases it is reasonable to produce the combined picture up to step 4 optically, and then to employ a computer for subsequent processing.

Yet it is recognized that to get a good quality image, it is preferable to perform all the procedures by computer; where the set of initial images has been received from standard 3-D pictures. In the application under claim, because the printing matrix is produced once, the cost of a fully computerized procedure of matrix preparation is negligible relative to the desired quality.

Some attention should be paid to discretizing step 5, which has been additionally introduced. In the claimed object, where the brightness (diffraction efficiency) is the most critical factor, the use of a discretizing step seems to be most reasonable. While incorporating the computerized processing, this step does not affect either expenses or time. If the discretization step is included the quality of the reconstructed images is not affected. Their brightness is globally maximized and becomes approximately 10 times greater than in the standard holographic reconstruction.

The questions of discretized informational reconstruction are discussed in the greatest detail in communication theory and are not repeated here.

Step 5 produces the following:

the resulting image (amplitude or phase, or optical or computer) that represents the set of complex Fourier transforms of initial images (being spatially separated by the use of spatial subcarriers), has been discretized. As a result, a binary spatial informational sequence is produced. The advantages of this procedure in the terms of brightness have been recognized and discussed in published articles of the inventor, and are not repeated here. The discretization procedure can be easily implemented optically by incorporating the nonlinearity of recording media.

The produced binary resulting space pattern (spatial-coordinate representation) is then realized physically as a printing matrix, which can be realized, for instance, as an embossing die. Such procedures have been widely used in Selectovision-systems.

The resulting matrix includes both the spectral information of the initial images (the principle not being widely used in art holograms) and the additional step binary discretization. These are dictated by the special application in the object under claim.

The printing matrix (in one special case, this is an embossing die), when sequentially applied to a corresponding medium (substrate), produces any desired area of the wallpaper under claim.

The step of spatial subcarrier informational distribution additionally produces mechanical invulnerability. Though spectral holograms are more susceptible to mechanical damage than are standard holograms, their sequential spatial repetition deals with this also.

The produced wallpaper, when coherently illuminated, produces the desired 3-D effect. The procedure for reconstruction of moving images or sets of separate stable images (or both) are discussed below.

The incorporation of the Fourier-encoding step (performed in Fourier-transformer 2) greatly improves the quality of the image in terms of contrast definition.

The special applications of holograms in the wallpaper under claim, which has already required the step of Fourier encoding, introduces new and additional features to the system of illumination. These are dictated by the following:

1. Ideally, the illumination system should be simple, low cost, and low in intensity;
2. To reconstruct the Fourier hologram, the inverse Fourier transform is immediately involved.

Figure 2:
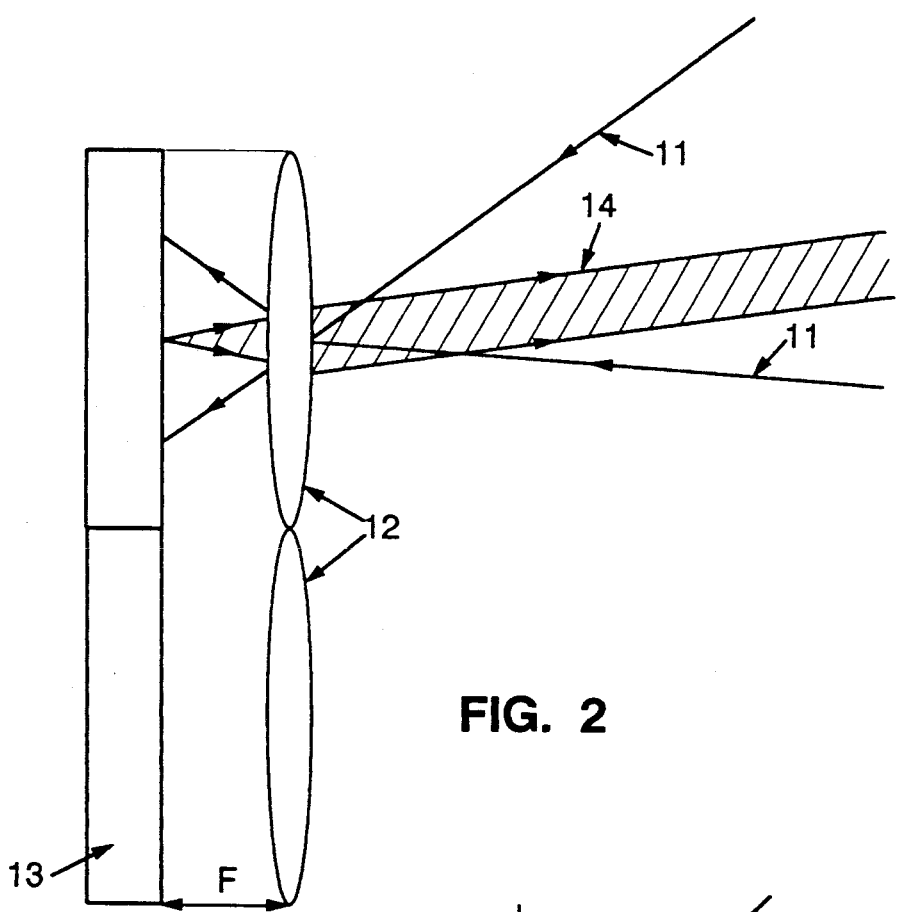
FIG. 2 is a schematic view of a portion of a system for reconstructing an image from the inventive wallpaper, in which the following reference numerals represent the following elements: 11 is an illuminating wave (a scanning beam); 12 is a set of spherical lenses; 13 is the encoded initial image; and 14 is the reconstructed image.

Both of these requirements are easily solved by providing scanning focused illuminating laser wave (or "beam") 11. (See FIG. 2). This, in due order, dictates the introduction of the set of spherical lenses 12. These cover the surface of the wallpaper, each lens corresponding to one of the encoded initial images 13.

Figure 3:
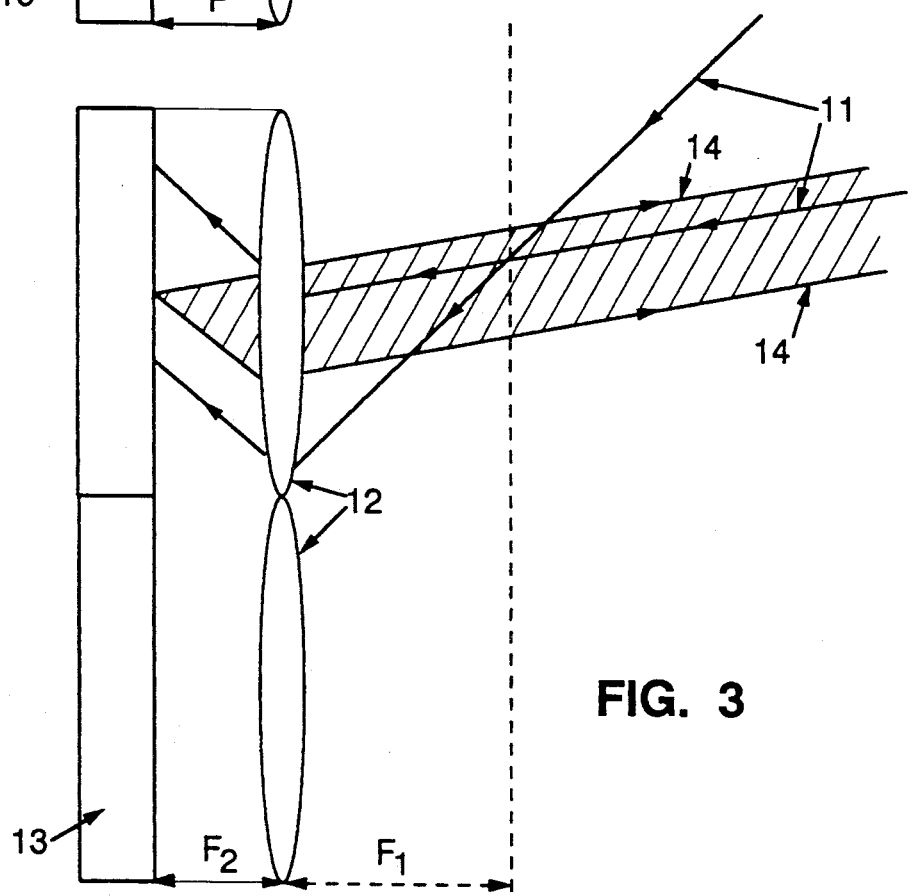
FIG. 3 is a schematic view of a variation on the FIG. 2 system, in which illuminating wave 11 is diverging when incident on lenses 12.

To provide all the needed transforms, illuminating scanning beam 11 can be focused in the virtual front focal plane of the said lenses. But then the required positive effect decreases slightly, because the lenses are in reality illuminating by a diverging light beam (see FIG. 3).

To deal with this negative feature the following measure is suggested. The scanning beam is focused on the lens surface, and the hologram(s) is illuminated by the plane wave. In this case, hologram(s) should be realized in the recognized "generalized" modification: the reference beam being made to be converging (when incident at the printing matrix surface), by positioning an additional spherical lens in the reference beam path during the step of registering (synthesizing) said hologram(s).

Technically, addition of lenses does not affect the above-described procedure or its cost; the lenses can be algorithmically included in the computerized process, and the printing matrix is to be produced with a spherically curved surface. If this procedure would be algorithmically too complicated, the introduction of the lenses can be realized physically (by affixing lenses to the printed wallpaper) after each step of printing.

The presence of the lenses serves two purposes:

a. The focused illuminating beam, passing through each of the lenses, is subjected to the inverse Fourier transform. The latter results in producing a plane wave, which illuminates the holographically encoded image.

b. The reconstructed beam, passing through each lens being inversely Fourier transformed, produces the desired 3-D image.

In concise terms, the principles of functioning of the object under claim can be expressed as:

1. The required quality of the reconstructed image demands the introduction of the Fourier-spectrum encoding.

2. This feature demands the focused illuminating beam, which additionally improves the brightness greatly.

3. Both features 1. and 2. demand the introduction of a Fourier lens for each separate spectrum.

Here it should be noted, that such lenses' coating is known in 3-D photography and in art holography. In 3-D photography no holographic effects are involved. In art holography, the coating serves an absolutely different purpose (not discussed here). Structurally, such holographic applications are entirely different because of their use of the transmitting plane-wave illumination.

The suggested new features serve the purposes of achieving a new and positive effect and the principle of their synthesizing was discussed above.

For further improvement of the desired effect, an inner layer of the wallpaper under claim can be realized as a reflecting surface by a metal coating of the resulting phase hologram. With such an inner reflective layer, the differences, compared to the standard holograms with the spatially distributed holograms can be clearly seen.

The wallpaper being scanned by the focused beam and the resulting effect being integrated by the viewer's eye, the corresponding brightness amplification is directly proportional to the scanning speed (or number of separate images being scanned).

Using existing mechanical (mirrors) and electrooptical (deflectors) elements, the scanning system can be produced inexpensively, with the period of scanning up to $10^{-8}$ sec, with the brightness improving correspondingly.

This scanning can be realized horizontally or vertically depending on the application.

To reconstruct independent separate images, or moving ones (or both) a two-coordinate scanning is suggested. It utilizes the recognized two-dimensional properties of spatial spectra. In simple terms, to reconstruct the separate images, having been placed on different subcarriers, the scanning by a second coordinate is involved.

This scanning is structurally incorporated in the suggested scanning system (only the control signals vary) and is realized either discretely for each of the set of initial images, or continuously for the moving ones, or both.

The description and synthesizing procedure being rather elaborate, the production and implementation of the object under claim are very simple, and the advantages are self-evident.

The use of the non-linear synthesizing principle discussed above, has led immediately to a new principle of functioning, which produces the desired positive effect with minimal structural cost.

In conclusion, it should be mentioned that the scanning system can easily provide the positioning of all the reconstructed images in the same spatial area (where, for instance, the consumer is situated). The principle involved is absolutely the same as in antennae fields (or in antennae with synthesized apertures.

Even the same monitoring signals can be utilized, and the said positioning of the reconstructed images can be discretionarily changed (the recording process should also be considered).

Figure 4:
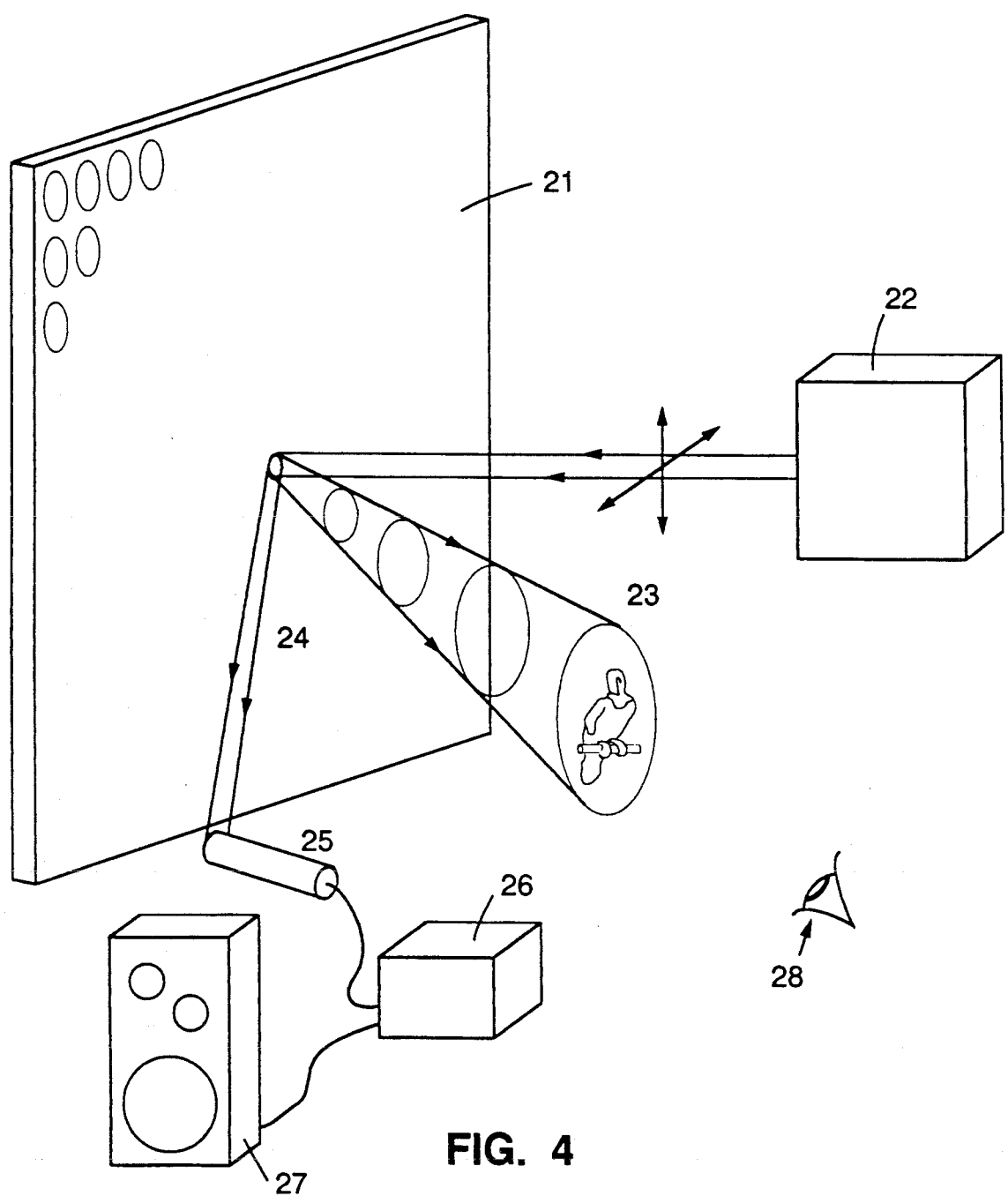
FIG. 4 is a schematic view of the wallpaper under claim, which also includes sound reproducing means, in which the following reference numerals represent the following elements: 21 is wallpaper (having spatially separated copies of a single relief Fourier hologram embossed thereon); 22 is a laser scanning illumination system; 23 is the optical path of the reconstructed image; 24 is the optical path of the sound signal; 25 is a photodetector; 26 is a sound amplifying means; 27 is a loudspeaker; and 28 represents the viewer.

By applying the above-discussed embossing and reconstruction techniques, wallpaper can additionally include sound signals. Recording of sound signals on wallpaper (in addition to images recorded in the form of digitized Fourier holograms, in the manner described above), and subsequent reconstruction of both the sound signal and image by scanning the wallpaper with a beam in accordance with the invention, does not affect either the complexity, cost, or quality of the image reconstruction. A sound signal, being a relatively low-frequency signal in comparison with an image, can be included with the image in a combined hologram. The sound signal can be reconstructed by the same scanning beam used to reconstruct the image, registered by an additional photodetector, and reproduced by a standard sound amplifying system (in the manner shown in FIG. 4 and described above with reference to FIG. 4). The principle involved is absolutely the same as in a conventional CD (audio compact disc) player.

An attractive feature of audio signal introduction to the inventive wallpaper is that an audio signal may easily be added to an already produced matrix (die). The sound pattern recorded on wallpaper in accordance with the invention, will of course be a repetitive pattern. An embossing process of the type described above may be employed to record both an image (or sequence of images) and an audio signal on wallpaper.

The invention allows production (and easy reproduction) of wallpaper at low cost, and in a manner so that the wallpaper is insensitive to damage in the following sense. Regardless of the level of mechanical damage to the wallpaper, an image (and/or sound signal) of the same quality may nevertheless be reconstructed by scanning the wallpaper.

Due to the extremely high quality of the sole embossing die prepared for images, the quality of the introduced audio signal exceeds any recognized quality of the existing sound reproducing systems.

In the device and method of the invention, it is possible additionally to reconstruct an enlarged or diminished image. The corresponding procedure is very simple and well known, and does not affect either the complexity or cost of implementing the invention. In the simplest case, the changes of linear dimensions are included in the step of Fourier transformation. Then on the reconstructing step with the involvement of already described scanning system, the reconstructed image will represent the enlarged or the diminished copy of the initial image. All the other features and advantages of the invention under claim remain valid.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A wallpaper system, including:
   a substrate, with spatially separated copies of a sole phase-relief Fourier hologram embossed thereon; and
   a means for scanning the embossed substrate with a focused, coherent beam and for reconstructing information having been recorded in the Fourier hologram by reflecting the beam from the embossed substrate.

2. The system of claim 1, also including:
a means for producing a printing matrix for sequentially embossing the sole Fourier hologram on the substrate, including a means for digitizing holograms, wherein the hologram are represented by their combined Fourier spectra, and a means for projecting the digitized hologram on an initial printing matrix; and
a set of spherical lenses superimposed on the embossed substrate, wherein each of the Fourier holograms is positioned in a back focal plane of a corresponding lens, wherein the beam is focused sequentially on one of the selected lenses, and wherein one or more images are reconstructed using the beam reflected from any selected spatial area on the substrate.

3. The system of claim 2, wherein data representing the spherical lenses are encoded on the initial matrix, and wherein the Fourier holograms and a representation of the spherical lenses are embossed on the substrate by using the same printing matrix.

4. The system of claim 1, also including a means for producing a printing matrix for embossing the Fourier holograms on the substrate, wherein the means for producing the printing matrix includes:
an initial matrix;
a spherical lens positioned adjacent the initial matrix; and
a means for illuminating the spherical lens with a reconstructing beam, wherein the lens converts the reconstructing beam to a diverging reconstructing beam, and wherein the diverging reconstructing beam is incident on the initial matrix.

5. The system of claim 1, wherein an inner reflective layer is formed on the substrate, and wherein the Fourier holograms having been embossed on the substrate are coated by metal.

6. The system of claim 1, including means for reconstructing a moving three-dimensional image, and also including related means for supplying the Fourier holograms with a spatial subcarrier and with at least one different spatial subcarrier; and wherein the coherent beam scans a two-dimensional pattern on the substrate.

7. The system of claim 1, wherein the means for scanning the embossed substrate and for reconstructing information include a means for reconstructing images such that the reconstructed images are produced only by a limited spatial region of the embossed substrate.

8. The system of claim 1, including:
a means for producing a printing matrix for embossing the Fourier holograms on the substrate, including means for introducing reference beam with variable incidence angles for producing the printing matrix; wherein
the coherent beam scans the embossed substrate with a pattern corresponding to the pattern of introduction of the reference beams, so that the reconstructing means reconstructs an image having a viewing angle-dependent appearance.

9. The system of claim 8, wherein a digitized sound signal is optically stored on the embossed substrate, and also including means for reconstructing the sound signal from the reflected beam from the embossed substrate.

10. The system of claim 9, also including a means for producing a printing matrix for embossing both the digitized sound signal and the Fourier holograms on the substrate.

11. A method of producing wallpaper, including the steps of:
sequentially applying spatially separated copies of a sole phase-relief Fourier hologram to a substrate by embossing the substrate by using a printing matrix; and
scanning the embossed substrate with a coherent, focused scanning beam.

12. The method of claim 11, also including the step of:
producing the printing matrix by digitizing the holograms, and employing the digitized holograms to generate the matrix with improved quality and diffraction efficiency; and
wherein the scanning beam is focused on a set of spherical lenses, wherein the lenses are structurally imposed on the embossed holograms in a manner so that each of the holograms is situated in the focal plane of a corresponding one of the lenses.

13. The method of claim 12, wherein the lenses diverge the scanning beam, and wherein the reflected diverged scanning beam from the embossed substrate is incident on the lenses.

14. The method of claim 12, wherein the digitized holograms are binary digitized holograms.

15. The method of claim 11, also including the step of forming a relief reflective layer on the substrate.

16. The method of claim 15, also including the step of embossing combined phase holograms on a pre-produced inner reflective layer.

17. The method of claim 11, wherein the printing matrix is produced in accordance with a computer algorithm in a manner so that the printing matrix includes information representing a lens, wherein a set of lenses is embossed on the substrate using the printing matrix, and wherein the set of lenses diverges the scanning beam incident thereon.

18. The method of claim 11, also including the step of generating the phase-relief Fourier hologram, wherein and step of generating the phase-relief Fourier hologram includes the step of:
generating a Fourier transform of a first image to be holographically recorded, and wherein the step of generating the Fourier transform incorporates a change of image size into the Fourier transform of the first image.

19. A method for producing wallpaper, including the steps of:
(a) sequentially applying spatially separated copies of a sole phase-relief Fourier hologram to a substrate by embossing the substrate by using a printing matrix, wherein each one of the holograms represents the same sequence of images; and
(b) after step (a), reconstructing the same sequence of images by operating a scanning system to scan the printed substrate with a coherent, focused beam.

20. The method of claim 19, wherein the scanning system is two-dimensional.

* * * * *